US 8,631,118 B2

(12) United States Patent
Shigeta et al.

(10) Patent No.: US 8,631,118 B2
(45) Date of Patent: Jan. 14, 2014

(54) RECORDING MEDIUM HAVING DISTRIBUTED PROCESSING PROGRAM STORED THEREIN, DISTRIBUTED PROCESSING DEVICE AND DISTRIBUTED PROCESSING METHOD

(75) Inventors: Soichi Shigeta, Kawasaki (JP); Toshihiro Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 479 days.

(21) Appl. No.: 12/346,300

(22) Filed: Dec. 30, 2008

(65) Prior Publication Data

US 2009/0187619 A1 Jul. 23, 2009

(30) Foreign Application Priority Data

Jan. 17, 2008 (JP) ................................. 2008-008355

(51) Int. Cl.
*G06F 15/173* (2006.01)
(52) U.S. Cl.
USPC .......................................... 709/224; 709/201
(58) Field of Classification Search
USPC ................................................ 709/224, 201
See application file for complete search history.

(56) References Cited

U.S. PATENT DOCUMENTS 6,757,730 B1 * 6/2004 Lee et al. ...................... 709/226
7,093,250 B1 * 8/2006 Rector ........................... 718/100

FOREIGN PATENT DOCUMENTS

| JP | 04-223548 | 8/1992 |
| JP | 05-012228 | 1/1993 |
| JP | A 11-195007 | 7/1999 |
| JP | 2000-242614 | 9/2000 |
| JP | 2003-208414 | 7/2003 |
| JP | A 2004-110318 | 4/2004 |

* cited by examiner

*Primary Examiner* — Thomas Dailey
(74) *Attorney, Agent, or Firm* — Greer Burns & Crain, Ltd.

(57) ABSTRACT

A computer executes a distributed processing program. The computer is a master computer that uses communicable worker computers to execute distributed processing on plural jobs. The computer determines an allocation destination of the jobs from the worker computers. The computer calculates the number of jobs to be allocated to the allocation destination based on the processing performance and the communication time (delay time) taken for communications with a worker computer. The computer generates a job group to be allocated to the allocation destination on the basis of a calculation result obtained. The computer transmits a processing request of the generated job group to the allocation destination.

15 Claims, 17 Drawing Sheets

| WORKER IDENTIFIER | IP ADDRESS | STATUS |
|---|---|---|
| W1 | xxx.yyy.z.t | IN USE |
| W2 | xxx.yyy.c.d | UNDER SUSPENSION |
| ... | ... | ... |
| Wi | xxx.yyy.g.j | IDLE |
| ... | ... | ... |
| Wm | xxx.yyy.k.l | IN USE |

FIG. 7

| JOB GROUP ID | PARAMETERS ASSOCIATED WITH COMMUNICATION TIME c | PARAMETERS ASSOCIATED WITH EXECUTION TIME OF JOB GROUP | | | |
|---|---|---|---|---|---|
| k | | NUMBER OF JOBS n | ELAPSED TIME t | WAITING TIME w | EXECUTION TIME $\delta$ |
| $JG_1$ | | $n_1$ | $t_1$ | $w_1$ | $\delta_1$ |
| $JG_2$ | | $n_2$ | $t_2$ | $w_2$ | $\delta_2$ |
| ... | | ... | ... | ... | ... |
| $JG_j$ | | $n_j$ | $t_j$ | $w_j$ | $\delta_j$ |
| ... | | ... | ... | ... | ... |
| $JG_p$ | | $n_p$ | $t_p$ | $w_p$ | $\delta_p$ |

700

700-1, 700-2, ..., 700-j, ..., 700-p

| WORKER IDENTIFIER | THROUGHPUT VALUE (T) | | |
|---|---|---|---|
| | A | B | C |
| W1 | T1a | — | T1c |
| W2 | — | — | — |
| ⋮ | ⋮ | ⋮ | ⋮ |
| Wi | Tia | Tib | Tic |
| ⋮ | ⋮ | ⋮ | ⋮ |
| Wm | Tma | — | — |

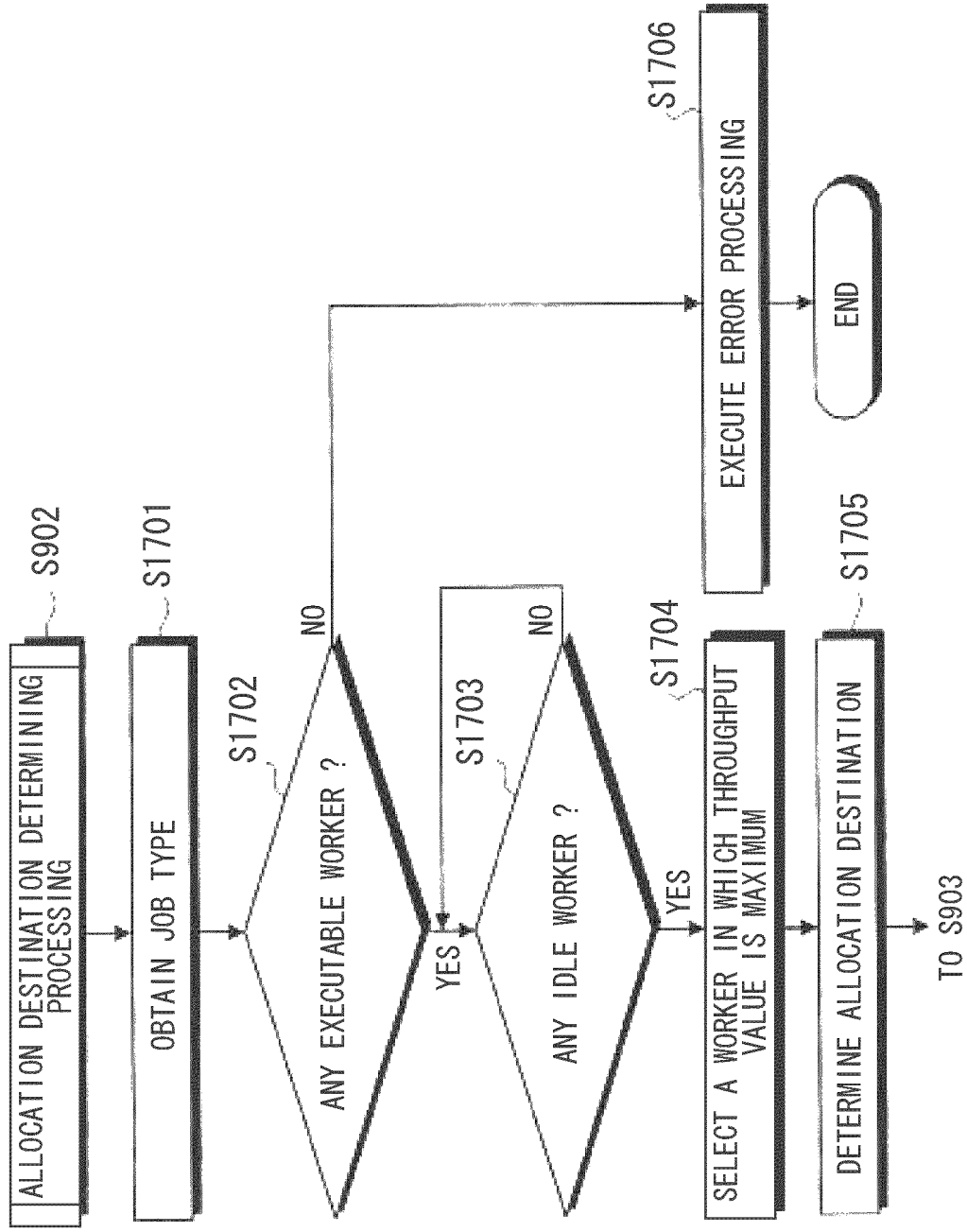

RECORDING MEDIUM HAVING DISTRIBUTED PROCESSING PROGRAM STORED THEREIN, DISTRIBUTED PROCESSING DEVICE AND DISTRIBUTED PROCESSING METHOD

CROSS-REFERENCE TO RELATED APPLICATIONS

This application is related to and claims priority to Japanese Patent Application No. 2008-8355 filed on Jan. 17, 2008 in the Japan Patent Office, and incorporated by reference herein.

BACKGROUND

1. Technical Field

The present invention relates to a distributed processing technique in grid computing in which a master computer (hereinafter referred to as "master") makes a plurality of worker computers (hereinafter referred to as "worker") execute distributed processing as a processing group.

2. Description of the Related Art

In the flow of a job taken between a master and a worker which can communicate with each other through a network, the master inputs a job and data required to process the job to the worker. Subsequently, the worker to which the job is input executes the processing of the job. Then, the worker returns the processing result of the job to the master. The master executes the above operation on plural workers, thereby making the workers execute the distributed processing of the overall job.

In general, the job input to the master is estimated to be a job the execution time of which is sufficiently larger than the communication delay time between the master and the worker (coarse-grained job). A technique of subjecting coarse-grained jobs to distributed processing has been in practical use. For example, System Walker CyberGrip (registered trademark) is a known grid middleware for executing distributed processing on a large amount of batch jobs, etc.

Furthermore, Japanese Laid-open Patent Publication No. 2004-110318 describes a technique of allocating processing on a task group basis, each task group comprising plural tasks. Specifically, first, the processing of a task group is allocated from a higher managing device to a lower managing device. Next, tasks contained in the task group are allocated from a lower managing device to a task execution device, and the task execution device executes the task and transmits the execution result to the lower managing device. The lower managing device collects the execution result and transmits the collection result to the higher managing device. Finally, the higher managing device aggregates and outputs the collection results.

Furthermore, Japanese Laid-open Patent Publication No. H11-195007 describes a technique of dynamically adjusting the task amount allocated from the master to the worker in accordance with the task request from the worker to the master. Specifically, the master first allocates a task to be processed to each worker. At that time, the same task load is first allocated to each worker, and the task load to be allocated in response to one task request is varied in accordance with a task request frequency from each worker within a predetermined time.

In the related techniques described above, the jobs input to the master are input to the workers on a job basis, thereby making the workers execute the distributed processing on all the jobs. This is an effective method in a case where the execution time of each job is sufficiently larger than the communication time between the master/worker. However, there are times when execution time of each job is shorter than the communication time between the master and the worker (fine-grained-job).

When jobs having a short execution time are input to workers on a job basis, overheads such as the communication time between the master and the worker, the idle time of a worker, etc. in the job processing increases significantly. Moreover, this induces a problem that the traffic on the network is increased and thus the required time taken for job processing is increased.

The present invention has an object to solve the above problem of the related arts, and has an object to reduce the communication traffic between a master and a worker in job processing, and implement efficient distributed processing by properly allocating a job group containing a bundle of jobs having short execution time.

SUMMARY

A computer executes a distributed processing program. The computer is a master computer for making a group of communicable worker computers execute distributed processing on plural jobs. The computer determines an allocation destination of the jobs based on information from the worker computer group. The computer calculates the number of jobs to be allocated to the allocation destination based on the processing performance and communication delay time of a worker computer as the determined allocation destination. The computer generates a job group to be allocated to the allocation destination on the basis of a calculation result obtained. The computer transmits a processing request of the generated job group to the allocation destination.

BRIEF DESCRIPTION OF THE DRAWINGS

FIG. 7 is a diagram showing a storage content of a parameter table;

FIG. 17 is a flowchart showing another example of the allocation destination determining processing flow.

DESCRIPTION OF THE PREFERRED EMBODIMENTS

The details of preferred embodiments of the present invention will be described with reference to the accompanying drawings. In this specification, a distributed processing device is a computer (master or worker) constituting a grid computing system, and a distributed processing program is a program installed in the distributed processing device.

(First Embodiment) (System Construction of Grid Computing System)

Figure 1:
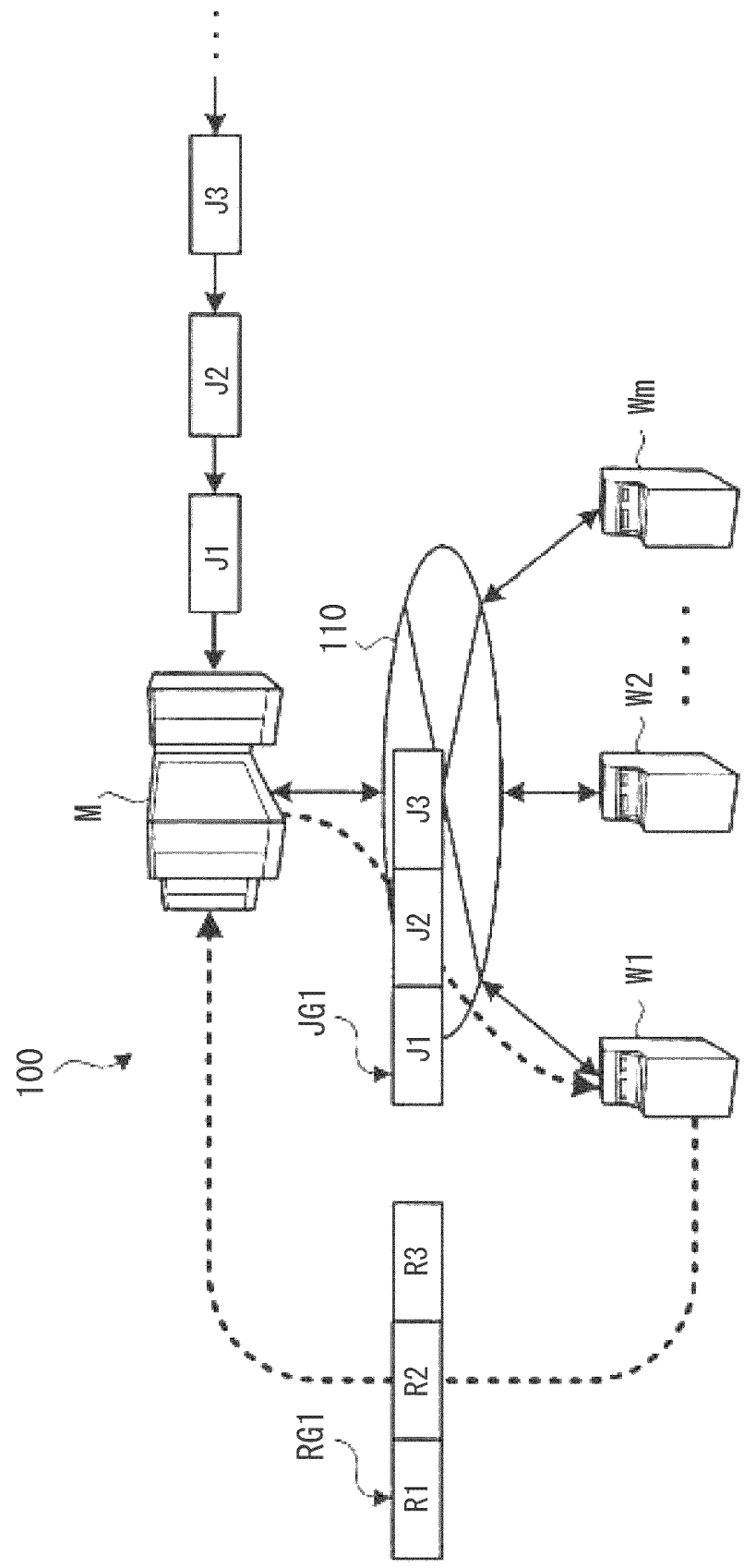
FIG. 1 is a system construction diagram of a grid computing system and a distributed processing device.

First, the system construction of a grid computing system 100 according to an embodiment of the present invention will be described. FIG. 1 is a diagram showing the system construction of the grid computing system 100 and the distributed processing device. In FIG. 1, the grid computing system 100 is constructed by a master M and workers W1 through Wm which can communicate with one another through a network 110 such as the Internet, LAN, WAN or the like.

The respective workers W1 to Wm may have different processing power, or may have different structures such as OS, hardware/architecture or the like. Furthermore, the communication quality of the network 110 is not required to be fixed or uniform.

In the grid computing system 100, a master M generates a job group obtained by bundling jobs having short execution time (for example, analyzing program), and inputs the job group to proper workers W1 to Wm. The workers W1 to Wm execute the input job group, and return the processing results to the master M. At this time, the processing results of the jobs are not returned on a job basis, but are returned on a job-group basis.

The execution times of the respective jobs taken between the master/workers are uniform. That is, the granularity of each job is uniform, or negligibly dispersed. Furthermore, the execution time of each job is shorter than the communication time (transfer time) between the master and the worker in the job processing.

Here, a processing target job is known as a fine-grained job having a short execution time to which processing of several tens of thousands to several tens of million calculations is required when a scenario is stochastically simulated by using the Monte Carlo method in an option risk calculation in banking facilities, for example.

When a large amount of fine-grained jobs having short execution time as described above are processed, and the jobs are input from the master M to the worker W1 to Wm on a job basis (one by one), overhead such as the communication time between the master and each worker and the idle time of each of the workers W1 to Wm in the job processing is significant. Therefore, a job group comprising a bundle of plural jobs is set as one processing unit.

Figure 2:
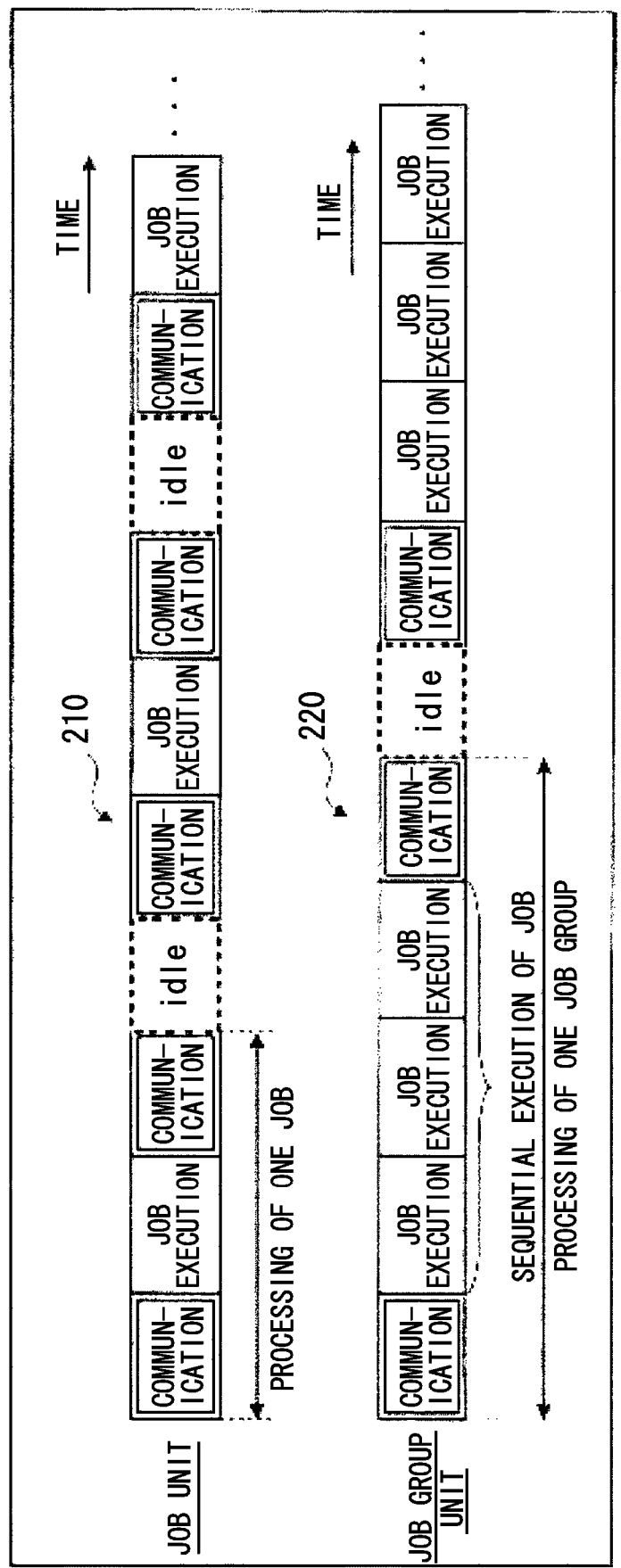
FIG. 2 is a diagram showing a job processing flow in a worker W.

FIG. 2 is a diagram showing the job processing processor in the worker W. In FIG. 2, a graph 210 represents a job processing process of a conventional style in which each of the workers W1 to Wm execute the distributed processing while a job having a short execution time is set as one processing unit. A graph 220 represents a job processing process of this embodiment in which each of the workers W1 to Wm executes the distributed processing while jobs having short execution times (three in FIG. 2) are bundled into a job group and the job group is set as one processing unit.

As shown in the graph 210, when the distributed processing is executed with a job having a short execution time as one processing unit, the overhead such as the communication time between the master and the worker, the idle time until the workers W1 to Wm receive the next jobs, etc. in the job processing is significant.

On the other hand, as shown in the graph 220, when the distributed processing is executed while plural jobs are bundled and set as one processing unit, the communication frequency and communication time between the master and the worker in the job processing can be reduced, and the overhead described above can be controlled. That is, the rate of the communication time and the idle time of the workers W1 to Wm to the total required time can be reduced.

Here, an example in which a job is input in the grid computing 100 will be described by using a worker W1 shown in FIG. 1. First, at the master M, a job group JG1 comprising a bundle of three input jobs J1, J2, J3 is generated. Next, the generated job group JG1 is input to the worker W1 determined as an allocation destination. Here, "input" means the transmission through the network 110.

Thereafter, at the worker W1, the job group JG1 input from the master M is executed, and after execution of all the jobs J1, J2, J3 constituting the job group JG1 is completed, a processing result RG1 comprising a bundle of processing results R1, R2, R3 of the jobs J1, J2, J3 is returned to the master M.

As described above, the distributed processing is executed while the job group JG1 comprising the bundle of plural jobs J1, J2, J3 is handled as one processing unit, whereby the communication time between the master M and the worker W1 in the job processing is reduced, and the overhead such as the communication time, the idle time, etc. is reduced.

Furthermore, the processing result processed in the worker W as the allocation destination is returned from the worker W1 as the allocation destination to the master M after the processing of all the jobs J1, J2, J3 is completed, thereby reducing the traffic on the network 110 during the process of the jobs J1, J2, J3.

(Hardware Construction of Master M and Worker W)

Figure 3:
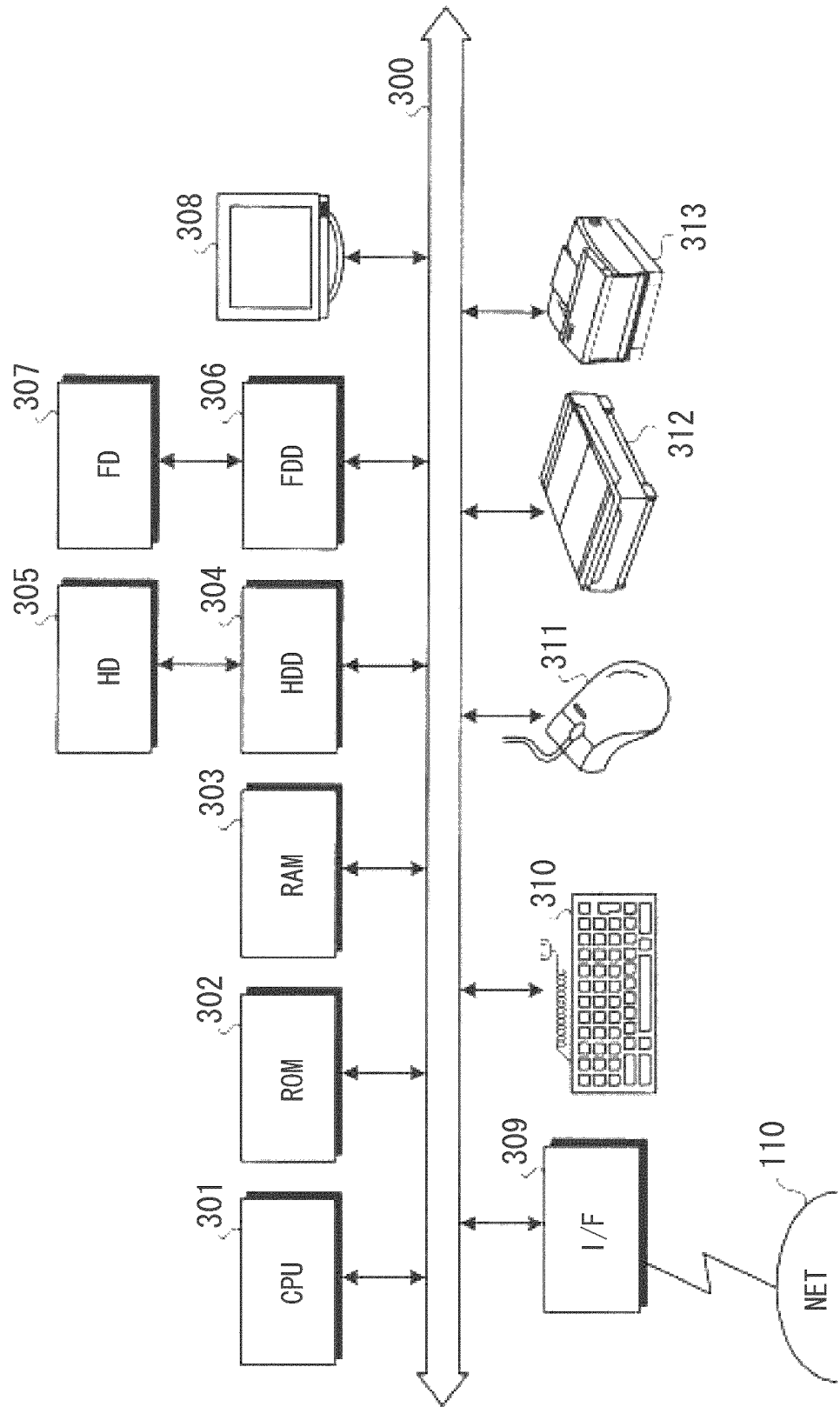
FIG. 3 is a block diagram showing the hardware construction of a master M and a worker W.

Next, the hardware construction of the master M and the workers W1 to Wm according to the first embodiment will be described. In the following description, "workers W1 to Wm" are represented as "worker W" unless particularly specified. FIG. 3 is a block diagram showing the hardware construction of the master M and the worker W.

In FIG. 3, each of the master M and the worker W contains CPU 301, ROM 302, RAM 303, HDD (hard disk drive) 304, HD (hard disk) 305, FDD (flexible disk drive) 306, an FD (flexible disk) 307 as an example of a detachable recording medium, a display 308, I/F (interface) 309, a keyboard 310, a mouse 311, a scanner 312 and a printer 313. The respective constituent parts are connected to one another through a bus 300.

Here, CPU 301 controls the whole of the master M and the worker W. ROM 302 records programs such as a boot program, etc. RAM 303 is used as a work area. HDD 304 controls read/write of data from/into HD 305 under the control of CPU 301. HD 305 stores data written under the control of HDD 304.

FDD 306 controls read/write of data from/into FD 307 under the control of CPU 301. FD 307 stores data written under the control of FDD 306 and makes the master M and the worker W read out data stored in FD 307.

Furthermore, the detachable recording medium may be CD-ROM (CD-R, CD-RW), MO, DVD (Digital Versatile Disk), a memory card or the like in addition to FD 307. The display 308 displays a cursor, icons, tool boxes and data such as a document, an image, function information or the like. CRT, TFT liquid crystal display, a plasma display or the like may be adopted as the display 308.

I/F 309 is connected to the network 110 such as the Internet or the like through a communication line, and also connected to other devices through this network 110. I/F 309 serves as an interface between the inside and the network 110, and controls the input/output of data from/to the network 110. For example, a modem, an LAN adaptor or the like may be adopted as I/F 309.

The keyboard 310 has keys for input of characters, numerals, various instructions, etc., and inputs data. Furthermore, a touch panel type input pad, ten keys or the like may be used. The mouse 311 moves the cursor, selects the range of the cursor, moves a window, changes the size of the window, etc. A trackball, a joy-stick or the like may be used insofar as it has the same function as a pointing device.

The scanner 312 optically reads an image to read the image data of the image into the device. The scanner 312 may be provided with the OCR function. Furthermore, the printer 313 prints image data and document data. A laser printer, an ink jet printer or the like may be adopted as the printer 313.

(Storage Content of Worker Managing Table)

Figure 4:
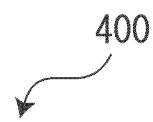
FIG. 4 is a diagram (part 1) showing a storage content of a worker managing table.

A worker managing table used when the IP addresses and use statuses (busy conditions) of the workers W1 to Wm as the allocation destinations of jobs are specified will be described. FIG. 4 is a diagram showing the storage content of the worker managing table. In FIG. 4, a worker identifier, an IP address and a status are stored in the worker managing table 400 for every worker (W1 to Wm).

The status means the use status (busy condition) of each of the workers W1 to Wm. This status is "idle" before a job is input from the master M. When a job is input from the master M, "idle" is changed to "in use". When a processing result is returned from each of the workers W1 to Wm, "in use" is changed to "idle". Furthermore, when the function of the worker W1 to Wm is stopped, "under suspension" is set. The function of this worker managing table 400 is implemented by the storage unit such as RAM 303, HD 305 or the like shown in FIG. 3.

(Storage Content of Throughput Table)

Figure 5:
FIG. 5 is a diagram (part 1) showing a storage content of a throughput table.

Here, the throughput table used when the processing performance of the workers W1 to Wm is specified will be described. FIG. 5 is a diagram showing the storage content of the throughput table. In FIG. 5, the throughput value is stored every worker (W1 to Wm) in the throughput table 500.

The throughput value is an index representing the processing performance of each of the workers W1 to Wm, and it represents the number of jobs processed per unit time. This throughput value dynamically varies in accordance with the CPU usage rate of each of the workers W1 to Wm (for example, during the processing of a job input from another computer device different from the master M).

Throughput values of workers W1 to Wm which have not yet been set as allocation destinations (for example, W2) are not stored ("–" in FIG. 5). The function of this throughput table 500 is implemented by the storage unit such as RAM 303, HD 305 or the like shown in FIG. 3.

(Functional Construction of Distributed Processing Device)

Figure 6:
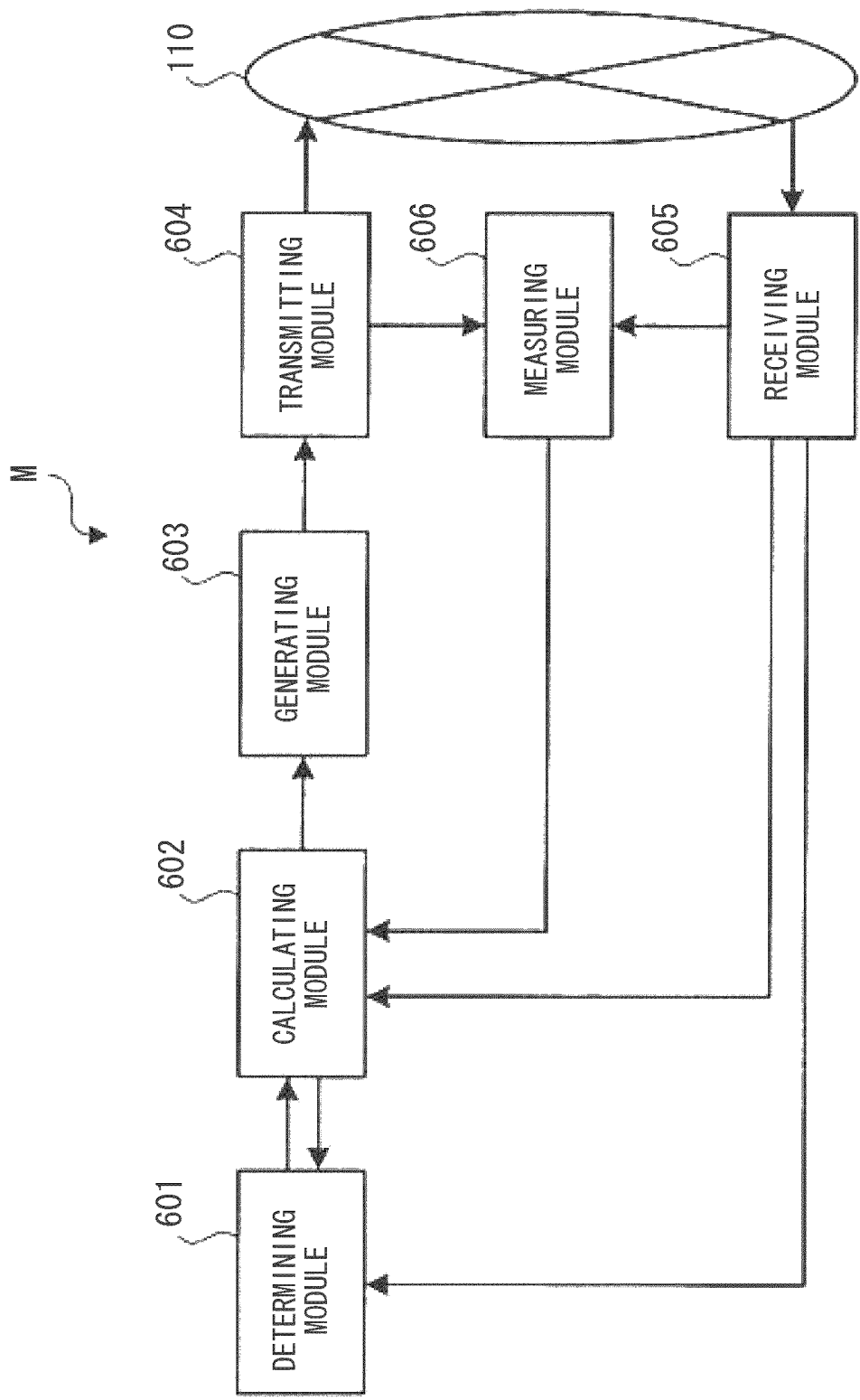
FIG. 6 is a block diagram showing the functional construction of the master M.

Next, the functional construction of the distributed processing device will be described. First, the functional construction of the master M will be described. FIG. 6 is a block diagram showing the functional construction of the master M. In FIG. 6, the master M comprises a determining module 601, a calculating module 602, a generating module 603, a transmitting module 604, a receiving module 605 and a measuring module 606.

Each of the functions 601 to 606 can be implemented by making CPU execute the programs associated with the functions 601 to 606 stored in the storage unit of the master M or by the input/output I/F. Furthermore, output data from each of the functions 601 to 606 are held in the storage unit. Furthermore, a connection destination indicated by an arrow in FIG. 6 reads out from the storage unit the output data from a connection source and makes the CPU execute the program associated with the function concerned.

First, the determining module 601 has a function of determining an allocation destination of a job from a worker W group. Specifically, the allocation destination may be determined from the worker W group on the basis of the use status (busy condition) of each worker W. For example, the status of each worker W is read out from the worker managing table 400, and an allocation destination is determined from a worker W group in which the use status is "idle". This means that workers W which are processing a job group allocated from the master M or whose functions are under suspension are excluded from the worker W group under the supervision, thereby narrowing down an allocation destination candidate.

Furthermore, the allocation destination may be determined from the worker W group on the basis of the processing performance of each worker W. For example, a throughput value T of each worker W is read out from the throughput table 500, and a worker W having the maximum throughput value T is determined as the allocation destination. This means that the worker W which can process the job group at high speed is determined as the allocation destination. Furthermore, a worker W having the maximum throughput value T may be determined as the allocation destination from a worker W group whose use status is "idle", or the allocation destination may be determined randomly.

The calculating module 602 has the function of calculating the number of jobs to be allocated to the allocation destination based on (a) the processing performance of the worker W as the allocation destination determined by the determining module 601 and (b) the communication time required for the communication with the allocation destination concerned. Specifically, the number of jobs "n" is calculated so that the execution time of the job group comprising a bundle of n jobs is equal to 1 to 2 times of the communication time between the master M and the worker W in the job processing, for example.

That is, overhead such as the communication time, the idle time, etc. in the job processing of the job group between the master M and the worker W is better controlled. A specific example of the calculation processing of the calculating module 602 will be described later.

The generating module 603 has the function of generating the job group to be allocated to the allocation destination based on n (the number of jobs) calculated by the calculating module 602. Specifically, for example, a series of jobs in a job queue are bundled by n (the number of jobs) calculated by the calculating module 602 to generate one job group. At this time, when the job queue does not contain enough number of jobs (less than n jobs in the queue), all the jobs in the job queue are bundled. Alternatively, the upper limit of the standby time may be set so that the processing is suspended until n jobs are queued in the job queue.

An inherent job ID (for example, J1, J2, J3 shown in FIG. 1, for example) is allocated to each job, and further a common job group ID (for example, JG1) is allocated to respective jobs constituting one job group. By allocating the job ID and the job group ID, the job group comprising plural jobs can be recognized.

The job queue is a data structure constructed in the storage unit of the master M, and has the function of queuing jobs input into the master M. A distributed-processing target job may be directly input to the master M, or it may be obtained from an external computer device through the network 110.

The transmitting module 604 has the function of transmitting to the allocation destination a processing request of the job group generated by the generating module 603. Specifically, it reads out the IP address of the worker W determined by the determining module 601 from the worker managing table 400, and sets the IP address concerned to the destination, whereby the processing request of the job group can be transmitted to the allocation destination. Furthermore, when the processing request is transmitted by the transmitting module 604, the status of the allocation destination in the storage content of the worker managing table 400 shown in FIG. 4 is rewritten from "idle" to "in use".

Here, a specific example of the calculation processing of the calculating module 602 will be described. The receiving module 605 has the function of receiving information concerning a waiting time and an execution time of a job group. These waiting time and execution time are measured by the allocation destination.

The waiting time is the time required from the detection of the reception of the processing request of one job group at the allocation destination until the preparation of the one job group (calling of a function required for the execution, etc.) is completed. The execution time is the time required from the start of the execution of the one job group until the execution of all the jobs constituting the one job group is completed. The information received by the receiving module 605 is stored in a parameter table 700 described later, for example.

The measuring module 606 has the function of measuring an elapsed time from the transmission of the processing request of one job group to the allocation destination till the reception of the processing result of the one job group from the allocation destination. Specifically, for example, it can measure the elapsed time from a transmission date and hour at which the processing request of the one job group is transmitted and a reception date and hour at which the processing result of the one job group is received. The measurement result measured by the measuring module 606 is stored in the parameter table 700, for example.

The calculating module 602 may calculate the communication time by using information concerning the waiting time and the execution time received by the receiving module 605 and the elapsed time measured by the measuring module 606. That is, the communication time between the master and the allocation destination is calculated by using past measurement values concerning the waiting time, the execution time and the elapsed time which are obtained by allocating the job group to the allocation destination.

The calculating module 602 may calculate the processing performance of the allocation destination by using the information concerning the execution time of one job group. That is, the processing performance of the allocation destination is calculated by using the past measurement values concerning the execution time which is obtained by allocating the job group to the allocation destination.

Here, the parameter table used for the calculation processing of the calculating module 602 will be described. The parameter table is held in association with the worker identifier for every worker W under the supervision of the master M. In this case, the parameter table of some worker W will be described. FIG. 7 is a diagram showing the storage content of the parameter table. In FIG. 7, parameter information 700-1 to 700-$p$ is stored in connection with each of parameters k, c relating to the communication time between the master and the worker, and the job groups JG1 to JGp allocated to the worker W.

Specifically, the parameter information 700-1 to 700-$p$ have parameters n, t, w, δ, k, c. The parameter n is a value representing the number of jobs contained in a job group. The parameter t is a value representing the elapsed time from the transmission of the processing request of the job group till the reception of the processing result of the job group in the master M. The parameter w is a value representing the waiting time from the reception of the processing request of the job group till the start of the execution of the job group in the worker W.

The parameter δ is a value representing the execution time taken to process one job group in the worker W. The parameters k, c are values concerning the communication time between the master M and the worker W. Here, the communication time between the master M and the worker W is a time to transmit the processing request from the master M to the worker W and transmit the processing result from the worker W to the master M.

Specifically, the communication time between the master M and the worker W can be determined by using the following equation (1). The communication time is represented by K, and the number of jobs constituting a job group is represented by n.

$$K = k*n + c \qquad (1)$$

The parameters k, c can be calculated by using the parameters t, w, δ. Specifically, the parameters k, c can be determined by using the following equation (2), for example.

$$T = w + \delta + (k*n + c) \qquad (2)$$

Describing in more detail, simultaneous equations of the parameters k, c (the following equations (3) and (4)) are set up with respect to x, y of nx≠ny (x, y represent natural numbers) by using the following equation (2), whereby the parameters k, c can be determined.

$$Tx = wx + \delta x + (k*nx + c) \qquad (3)$$

$$Ty = wy + \delta y + (k*ny + c) \qquad (4)$$

Thereafter, two parameter information pieces 700-1 to 700-$p$ satisfying nx≠ny are read out from the parameter table 700. Parameters nx, ny, tx, ty, wx, wy, δx, δy contained in the read-out parameter information pieces 700-1 to 700-$p$ are substituted into the equations (3) and (4) to calculate the parameters k, c.

When the two parameter information pieces 700-1 to 700-$p$ satisfying nx≠ny are read out, two parameter information pieces 700-1 to 700-$p$ which were stored at the most latest time.

Furthermore, a parameter τ representing the execution time per job can be calculated by using the parameters δ, n. Specifically, for example, the parameter τ can be calculated by using the following equation (5). Here, j represents a natural number from 1 to p.

$$\tau = \frac{\sum_{j=1}^{p} \delta j}{\sum_{j=1}^{p} nj} \quad (5)$$

By substituting the calculated parameters τ, k, c into the following equation (6), n which represents the number of jobs bundled as one job group can be calculated. Here, s is a parameter representing that the execution time of the job group having n jobs is s-times as large as the communication time K. The value of the parameter s can be set to any value (for example, s=1).

$$n*\tau = s(k*n+c) \quad (6)$$

When n (the number of jobs to be bundled as one job group) calculated by using the above equation (6) satisfies n>0, for example, a fluctuation of several % may be provided to the n concerned, and the fluctuation of several % may be set as the new n. When the n calculated by using the above equation (6) satisfies n<0, for example, a preset number (for example, n=1) may be set.

The user may operate the keyboard 310 or the mouse 311 shown in FIG. 3 to set the value of the parameter s to any value. Furthermore, when the number of jobs input to the master M is large, the value of the parameter s may be increased (for example, s=3), and the value of the parameter s may be reduced (for example, s=1) as the number of jobs in the job queue decreases.

Furthermore, the throughput value T stored in the throughput table 500 shown in FIG. 5 can be represented by the reciprocal number (1/τ) of the parameter τ calculated by using the equation (5), that is, the number of jobs which can be processed per unit time.

Still furthermore, the storage content of the parameter table 700 is updated every time the processing result is received from the worker W under the supervision. The throughput value T is also updated every time the storage content of the parameter table 700 is updated. The update processing of renewing the parameter table 700 will be described later.

When the parameter information pieces 700-1 to 700-p required to calculate the parameters k, c are not stored in the parameter table 700 (for example, in the initial distributed processing), preset initial values may be used. That is, the initial values corresponding to the parameters nx, ny, tx, ty, wx, wy, δx, δy are substituted into the equations (3) and (4) to calculate the parameters k, c.

Figure 8:
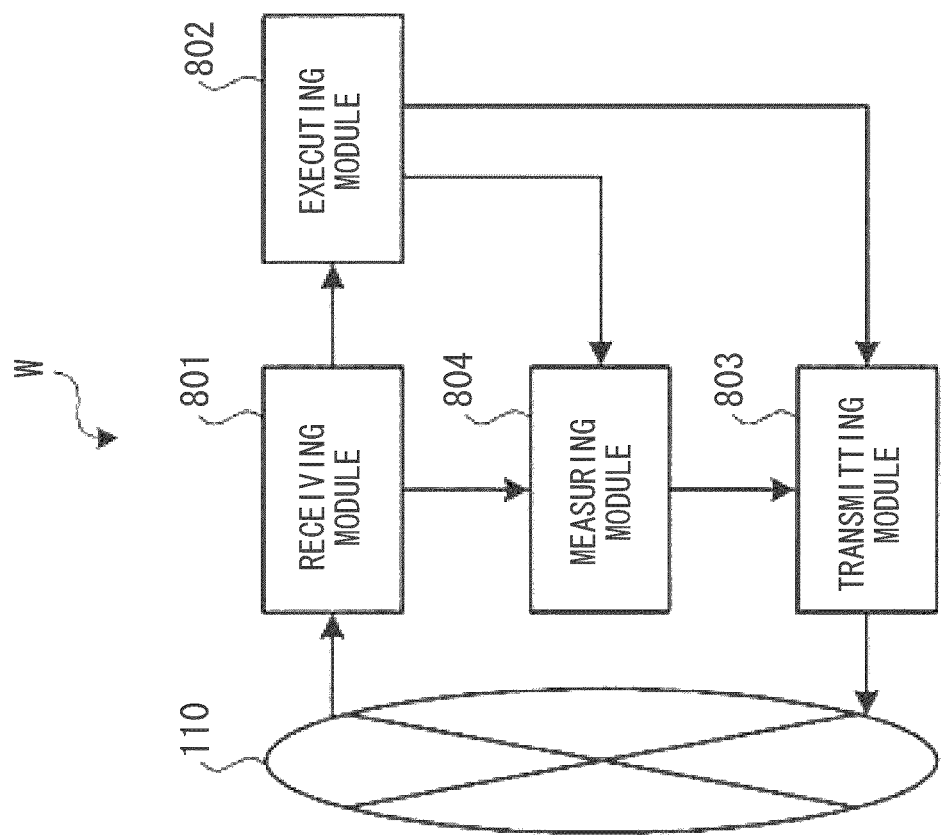
FIG. 8 is a block diagram showing the functional construction of the worker W.

Next, the functional construction of the worker W will be described. FIG. 8 is a block diagram showing the functional construction of the worker W. In FIG. 8, the worker W is constructed by a receiving module 801, an executing module 802, a transmitting module 803 and a measuring module 804.

Each of these functions 801 to 804 can be implemented by making CPU 301 execute programs associated with the functions 801 to 804 concerned stored in the storage unit of the worker W or by the input/output I/F. The output data from each of the functions 801 to 804 are held in the storage unit. Furthermore, the function of a connection destination indicated by an arrow in FIG. 8 reads out from the storage unit the output data from the function of a connection source and makes the CPU execute the program relating to the function concerned.

First, the receiving module 801 has the function of receiving the processing request of a job group from the master M. The executing module 802 has the function of executing the processing of the job group allocated from the master M. The processing of the job group is executed by the CPU of the worker W, and the processing result is held in the storage unit in the worker W.

The transmitting module 803 has the function of transmitting the processing result of the job group to the master M as a result of the completion of the execution of processing on all the jobs constituting the job group by the executing module 802. The execution completion of the job group can be detected by the following procedure, for example. Specifically, the executing module 802 notifies the transmitting module 803 of the number of jobs n which is contained in the job group in advance at the start time of the processing of the job group.

Furthermore, the executing module 802 notifies the transmitting module 803 of the execution result every time execution of each job contained in the job group is completed. By counting the number of the execution results of the jobs notified from the executing module 802, the transmitting module 803 can detect that the execution of all the jobs contained in the job group has been completed. That is, the transmitting module 803 detects that the execution of the job group is completed when receiving the execution results whose number is equal to the number of jobs n (which notified from the executing module 802 in advance).

When it is detected that the execution of all the jobs has been completed, the transmitting module 803 transmits the processing result of the job group to the master M. At this time, the processing result can be transmitted to the master M by setting the IP address specified from the processing request of the job group to a destination.

The measuring module 804 has the function of measuring the waiting time from the reception of the processing request of the job group by the receiving module 801 till the start of the execution of the job group by the executing module 802. Specifically, for example, the waiting time can be measured from the reception date and hour at which the processing request is received and the start date and hour at which the execution of the job group is started.

The measuring module 804 has the function of measuring the execution time of the job group by the executing module 802. Specifically, for example, the execution time can be measured from a start date and hour at which the execution of the group is started, and a completion date and hour at which the execution of the job group is completed.

The transmitting module 803 has the function of transmitting to the master M the information concerning the waiting time and/or execution time measured by the measuring module 804. This information is received by the receiving module 605 of the master M, and is used for the calculation processing of the calculating module 602.

(Distributed Processing Flow of the Distributed Processing Device)

Figure 9:
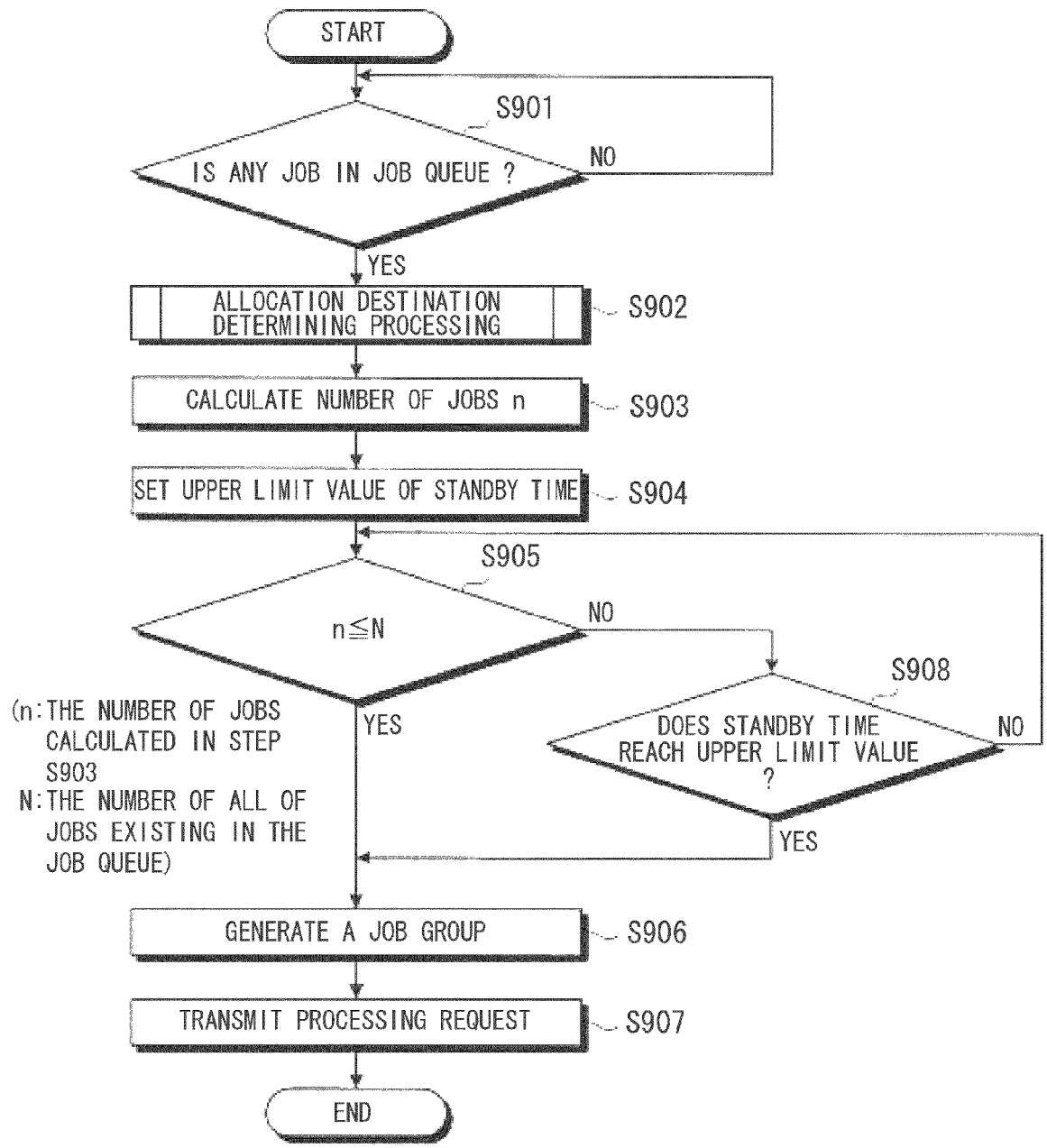
FIG. 9 is a flowchart showing an example of the distributed processing flow in the master M.

Next, the distributed processing flow of the distributed processing device will be described. First, the distributed processing flow in the master M will be described. FIG. 9 is a flowchart showing an example of the flow of the distributed processing in the master M. In the flowchart of FIG. 9, it is first judged whether any job exists in a job queue (step S901).

Here, the determining module 601 waits until a job is input to the master M (step S901: No), and when a job exists in a job queue (step S901: Yes), the determining module 601 executes allocation destination determining processing of determining an allocation destination of the job from workers under supervision (step S902).

Thereafter, the calculating module 602 calculates the number of jobs n to be bundled as one job group to be allocated to the allocation destination (step S903), based on the processing performance of a worker W determined as the allocation destination in step S902 and a communication time taken for communications with the allocation destination.

Subsequently, the upper limit value of the standby time for waiting for the job input to the job queue is set (step S904). Thereafter, it is judged whether the number of jobs n calculated in step S903 is not more than N which is the number of all of the jobs existing in the job queue (step S905).

Here, when the number of jobs n<N (step S905: Yes), the generating module 603 generates a job group which contains n jobs (step S906). Then, the transmitting module 604 transmits the processing request of the job group generated in step S906 to the allocation destination (step S907), and then finishes a series of processing based on this flowchart.

In step S905, when the number of jobs n>N (step S905: No), it is judged whether the time reaches the upper limit value of the standby time set in step S904 (step S908). Here, if the time does not reach the upper limit value (step S908: No) the processing returns to the step S905.

On the other hand, when the time reaches the upper limit value (step S908: Yes), the generating module 603 generates a job group to be allocated to the allocation destination by bundle all of N jobs existing in the job queue (step S906).

The upper limit value of the standby time set in step S904 may be set to a predetermined value (for example, one minute), or the upper limit value may be automatically selected from plural upper limit value candidates in accordance with the number of jobs n.

Specifically, for example, by referring to the upper limit value table representing the number of jobs n and the upper limit value in association with each other, the upper limit value corresponding to the number of jobs calculated in step S903 may be selected and set as the upper limit value of the standby time. This upper limit value table is held in the storage unit of the master M in advance.

Furthermore, when the upper limit value of the standby time is set in step S904, the measurement of the standby time is started, and then it may be judged whether the elapsed time from the setting of the upper limit value in step S908 has reached the upper limit value of the standby time.

Figure 10:
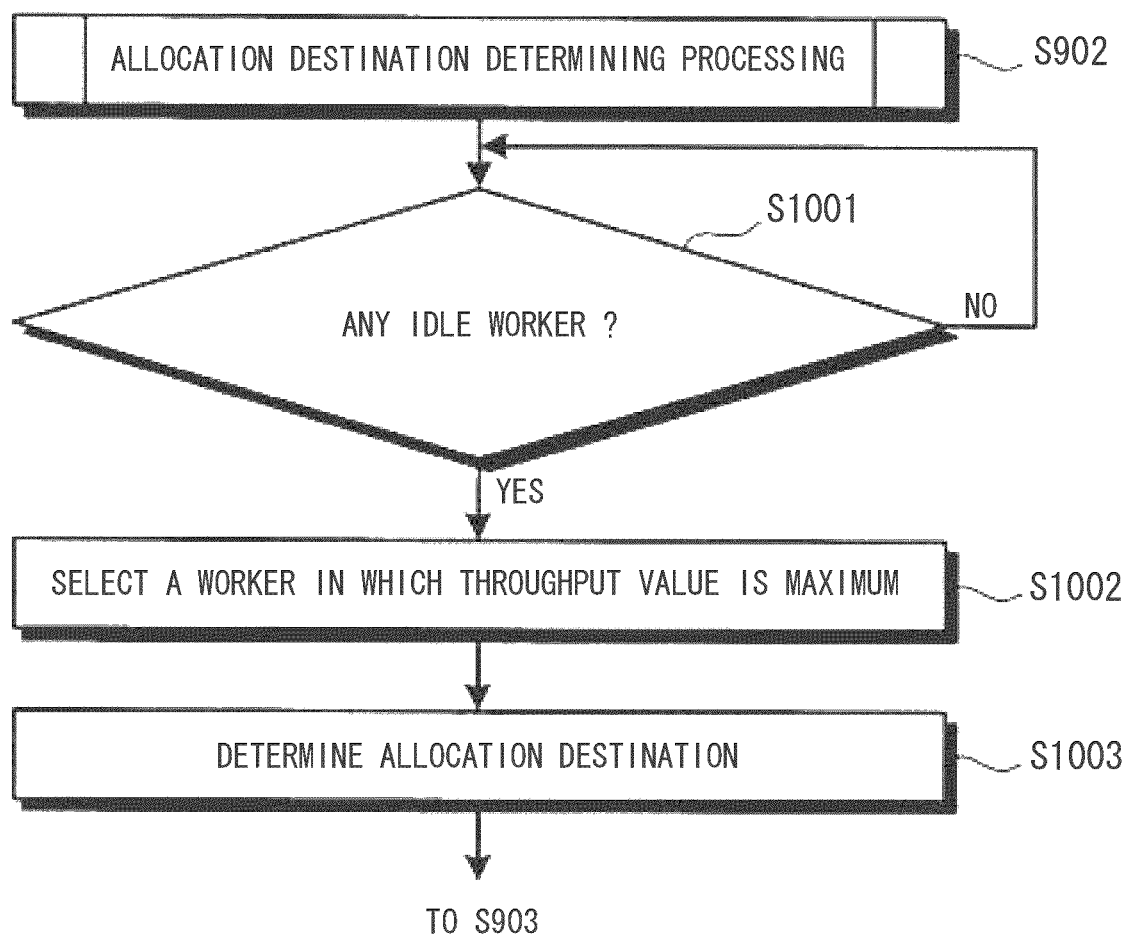
FIG. 10 is a flowchart showing an example of an allocation destination determining processing flow.

Next, the detailed processing flow of the allocation destination determining processing in step S902 of FIG. 9 will be described. FIG. 10 is a flowchart showing an example of the allocation destination determining processing. In FIG. 10, first, it is judged on the basis of the worker managing table 400 whether there is any idle worker W (step S1001). Here, if there is no idle worker W (step S1001: No), the processing waits until some worker W can be used.

On the other hand, if there is any idle worker W (step S1001: Yes), a worker W having the maximum throughput value T is selected form the idle workers W on the basis of the throughput table 500 (step S1002). Then, the worker W selected in step S1002 is determined as an allocation destination (step S1003), and then the processing shifts to step S903 shown in FIG. 9.

Figure 11:
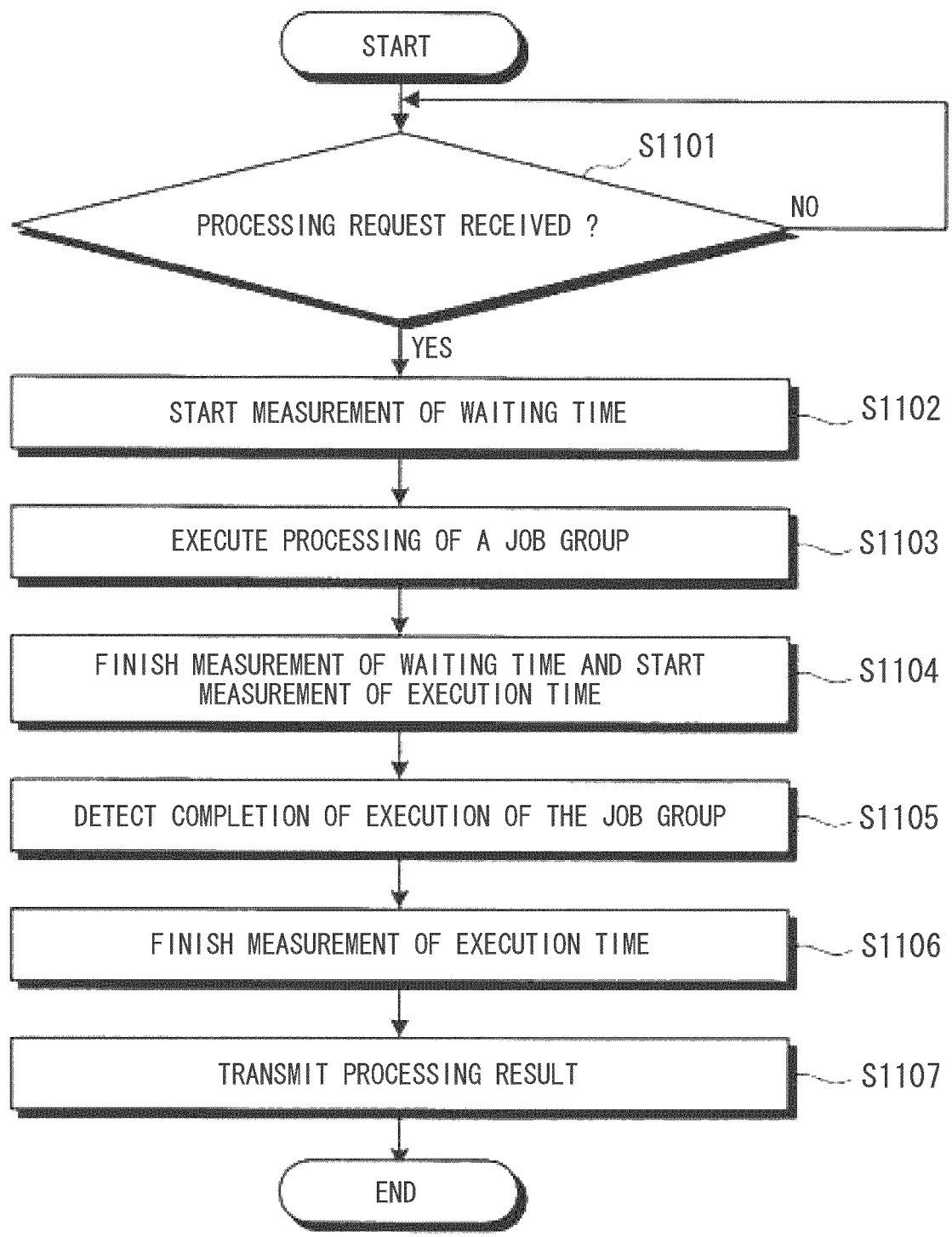
FIG. 11 is a flowchart showing an example of the distributed processing flow in the worker W.

Next, the distributed processing flow in the worker W will be described. FIG. 11 is a flowchart showing an example of the distributed processing flow in the worker W. In the flowchart of FIG. 11, first, the receiving module 801 judges whether a processing request of a job group from the master M is received (step S1101).

The processing waits until the processing request is received (step S1101: No) and if it receives the processing request (step S1101: Yes) the measuring module 804 starts the measurement of the waiting time from the reception of the processing request of the job group till the start of the execution of the job group (step S1102).

Thereafter, the executing module 802 executes the processing of the job group allocated from the master M (step S1103). At this time, the measuring module 804 finishes the measurement of the waiting time, and also starts the measurement of the execution time of the job group (step S1104)

Thereafter, when it is detected that the execution of all the jobs constituting the job group is completed (step S1105), the measuring module 804 finishes the measurement of the execution time of the job group (step S1106). Then, the transmitting module 803 transmits the processing result of the job group containing the measurement result of the measuring module 804 to the master M (step S1107), and finishes the series of processing based on this flowchart.

Figure 12:
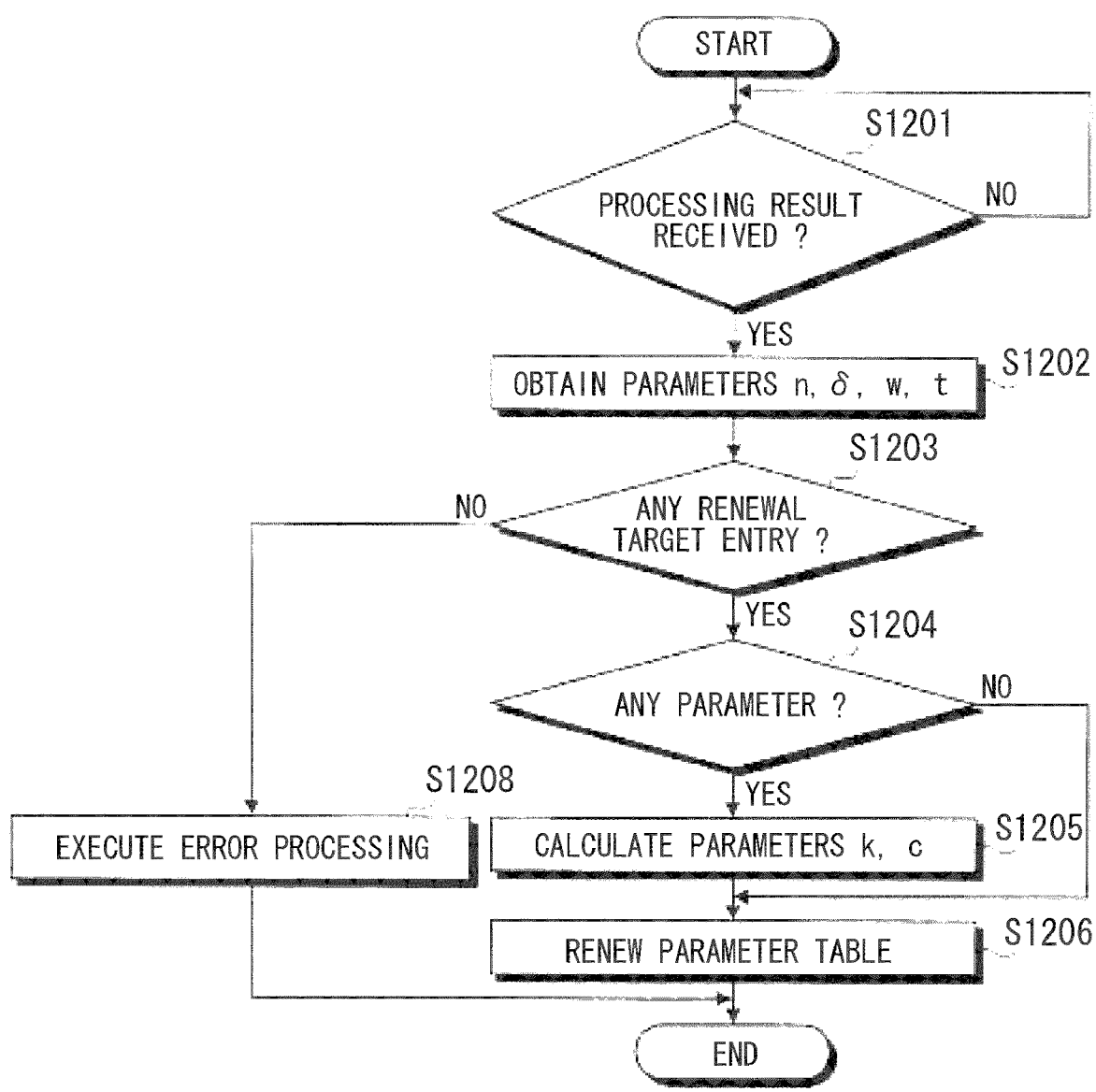
FIG. 12 is a flowchart showing an example of an update processing flow of the parameter table.

Next, the update processing flow of renewing the storage content of the parameter table 700 shown in FIG. 7 in the master M will be described. FIG. 12 is a flowchart showing an example of the update processing flow of the parameter table. In the flowchart of FIG. 12, the receiving module 605 first judges whether the processing result of the job group has been received from the worker W (step S1201).

Here, the processing waits until the processing result of the job group is received (step S1201: No), and when the processing result of the job group is received (step S1201: Yes), the parameters n, δ, w are obtained from the processing result of the job group, and also the parameter t (which is the measurement result of the measuring module 606) is obtained from the storage content of the parameter table 700 by specifying the job group ID (step S1202).

Thereafter, it is judged on the basis of the worker managing table 400 whether there is any entry to be updated (step S1203). This is a step of judging whether the processing result received in step S1201 has been received from a worker W under the supervision of the master M.

Here, when there is an entry to be updated (step S1203: Yes), it is judged whether there is any parameter which has been stored in the parameter table 700 of the entry concerned (step S1204). This is a step of judging whether the reception of the processing result in step S1201 is the initial reception.

Here, when there is a parameter which has been stored (step S1204: Yes), the calculating module 602 calculates the parameters k, c by using the storage content of the parameter table 700 and the parameters n, δ, w, t obtained in step S1202 (step S1205).

Thereafter, the storage content of the parameter table 700 is updated by using the parameters n, δ, w, t obtained in step S1202 and the parameters k, c calculated in step S1205 (step S1206), and the series of processing based on this flowchart is finished.

When there is no stored parameter in step S1204 (step S1204: No), the storage content of the parameter table 700 is updated by using the parameters n, δ, w, t obtained in step S1202 (step S1206), and the series of processing based on this flowchart is finished.

Furthermore, when there is no entry to be updated in step S1203 (step S1203: No), the error processing of forcedly finishing the update processing is executed (step S1208), and then the series of processing based on this flowchart is finished. Furthermore, in step S1206, the storage content (throughput value T) of the worker managing table 400 may be updated in conformity with the renewal of the storage content of the parameter table 700.

As described above, according to the first embodiment, jobs in which the job-basis execution time is shorter than the communication time between the master M and the worker W can be bundled as a job group and subjected to distributed processing by a worker group on a job-group basis. At this time, making a bundle of plural jobs is carried out for every workers W corresponding to the processing performance of a worker W as an allocation destination, so that the finish time can be equalized among the workers W.

As described above, a job group comprising a bundle of jobs whose execution times are short is properly allocated to a worker W, whereby the communication traffic between the master M and the worker W in the job processing can be reduced, and thus efficient distributed processing can be implemented.

Figure 13:
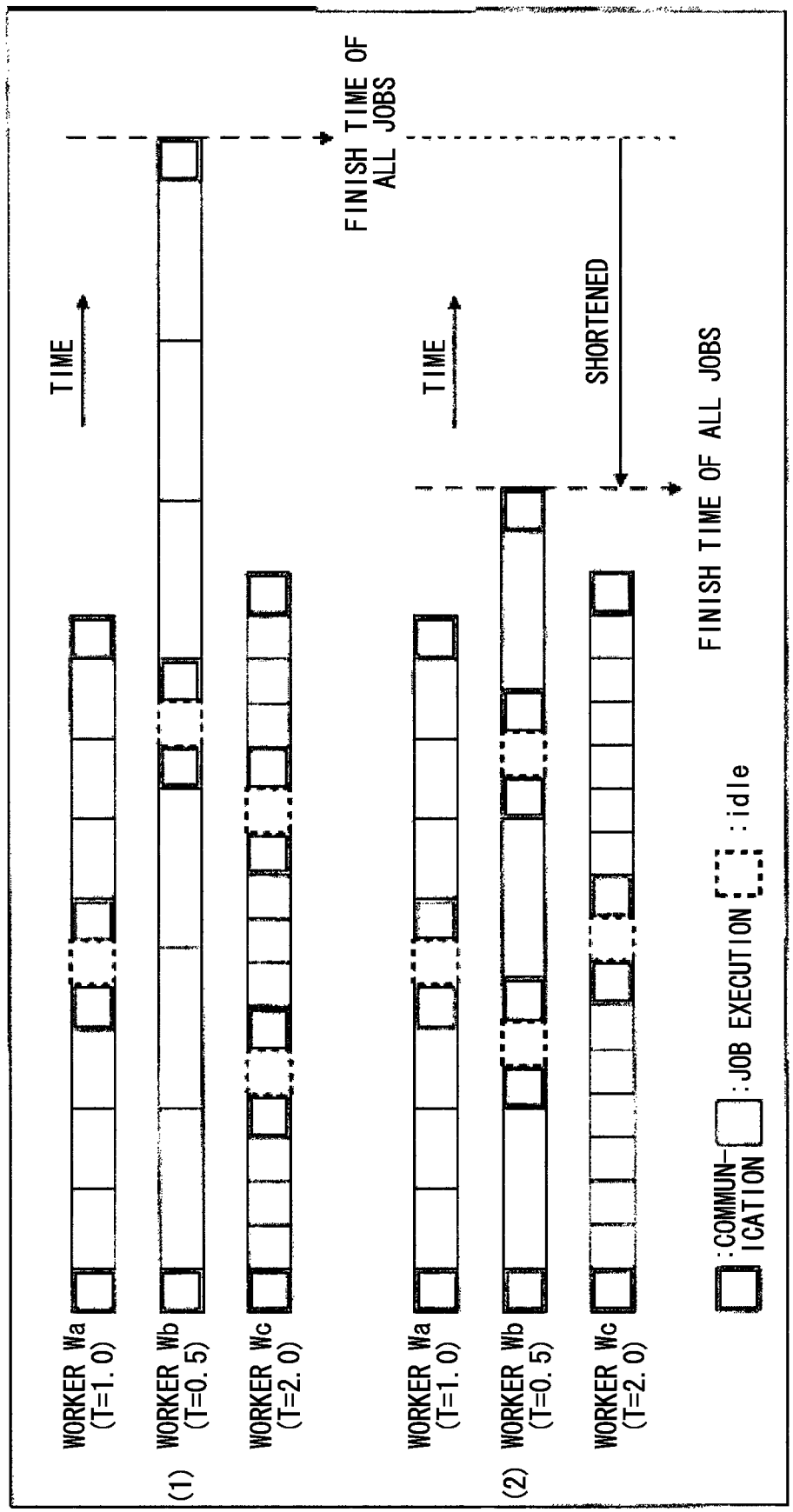
FIG. 13 is a Gantt chart showing a required time for every worker W.

Here, the efficiency when plural jobs are subjected to the distributed processing by workers Wa, Wb, Wc different in processing performance will be specifically described. FIG. 13 is a Gantt chart showing a required time for every worker W. In FIG. 13, (1) represents a required time when a fixed number (three in this case) of jobs are bundled without consideration of the processing performance (throughput value T) of the workers Wa, Wb, Wc.

(2) represents a required time when the number of jobs to be bundled is varied in accordance with the processing performance (throughput value T) of the workers Wa, Wb, Wc as described in the embodiment. In (1), the processing performance is controlled (restricted) by the worker Wb having low processing performance, and the finish time of all the jobs is delayed.

On the other hand, in (2), the job groups whose number of jobs is determined in accordance with the processing performance of each of the workers Wa, Wb, Wc are allocated to the workers Wa, Wb, Wc, and thus the respective required times for the job processing in the workers Wa, Wb, Wc are equalized, so that the finish time of all the jobs is shorter than that in the case (1).

(Second Embodiment)

Next, the distributed processing device according to a second embodiment will be described. In the second embodiment, the distributed processing when an acceptable (executable) job type is different for every worker (W1 to Wm) constituting the grid computing system 100 shown in FIG. 1 (containing a case where the acceptable (executable) job type is identical) will be described. The same elements as described with reference to the first embodiment are represented by the same reference numerals, and the illustration and the description thereof are omitted.

First, the functional construction of the master M according to the second embodiment will be described. The determining module 601 has the function of determining an allocation destination from a worker group based on the job type. The job type is the type of a job which is classified by a function name called at the execution time of the job.

More specifically, the job type can be classified in accordance with applications which run at the execution time of jobs. That is, in accordance with the function provided by each worker W, there is a case where a job input from the master M can be executed or a case where the job cannot be executed. Therefore, the master M judges the job type, then determines appropriate allocation destinations of the jobs.

Figure 14:
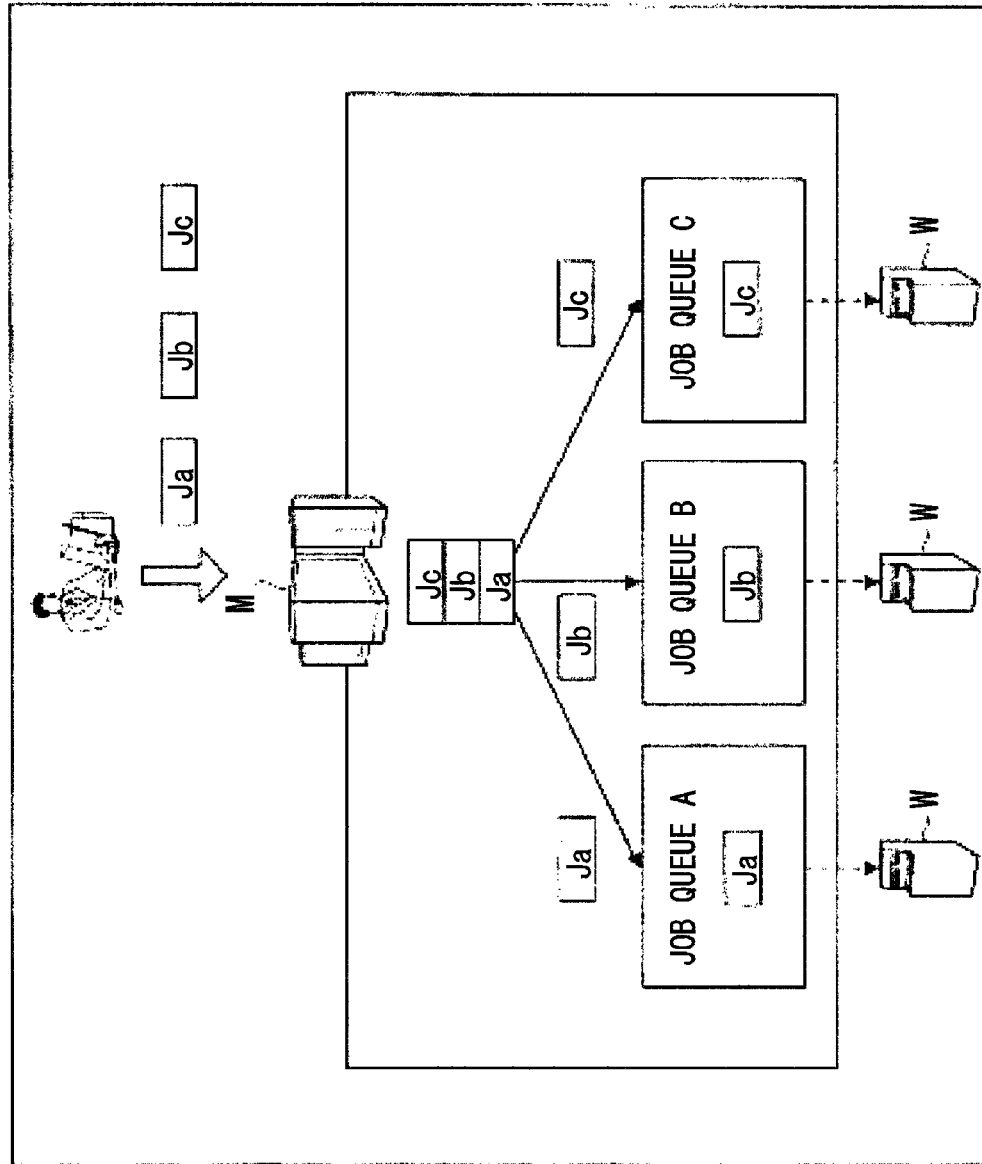
FIG. 14 is a diagram showing the summary of the distributed processing flow.

Here, the distributed processing flow of the master M according to the second embodiment will be described. FIG. 14 is a diagram showing the distributed processing flow. In FIG. 14, it is assumed that three jobs Ja, Jb, Jc different in job type are input to the master M. In this case, the job type of the job Ja is represented by A, the job type of the job Jb is represented by B, and the job type of the job Jc is represented by C.

In this case, the job type of each of the jobs Ja, Jb, Jc is identified, and the jobs Ja, Jb, Jc corresponding to job queues A, B, C which are classified for every job type are arranged.

In this case, the job Ja is put into the job queue A, the job Jb is put into the job queue B, and the job Jc is put into the job queue C.

Thereafter, the determining module 601 determines allocation destinations of the jobs Ja, Jb, Jc (put into the respective job queues A, B, C) with consideration of the executable job type of each worker W.

Furthermore, when there exist plural workers W which can execute jobs of some job type, the determining module 601 may determine the worker W having the maximum throughput value as the allocation destination. At this time, for example, there may be set such a policy that when the allocation destination of the jobs of the job type A is determined, the worker W having the maximum throughput value is determined, and when the allocation destination of the jobs of the job type B is determined, the worker W having a throughput value of 2 or more is determined.

Figure 15:
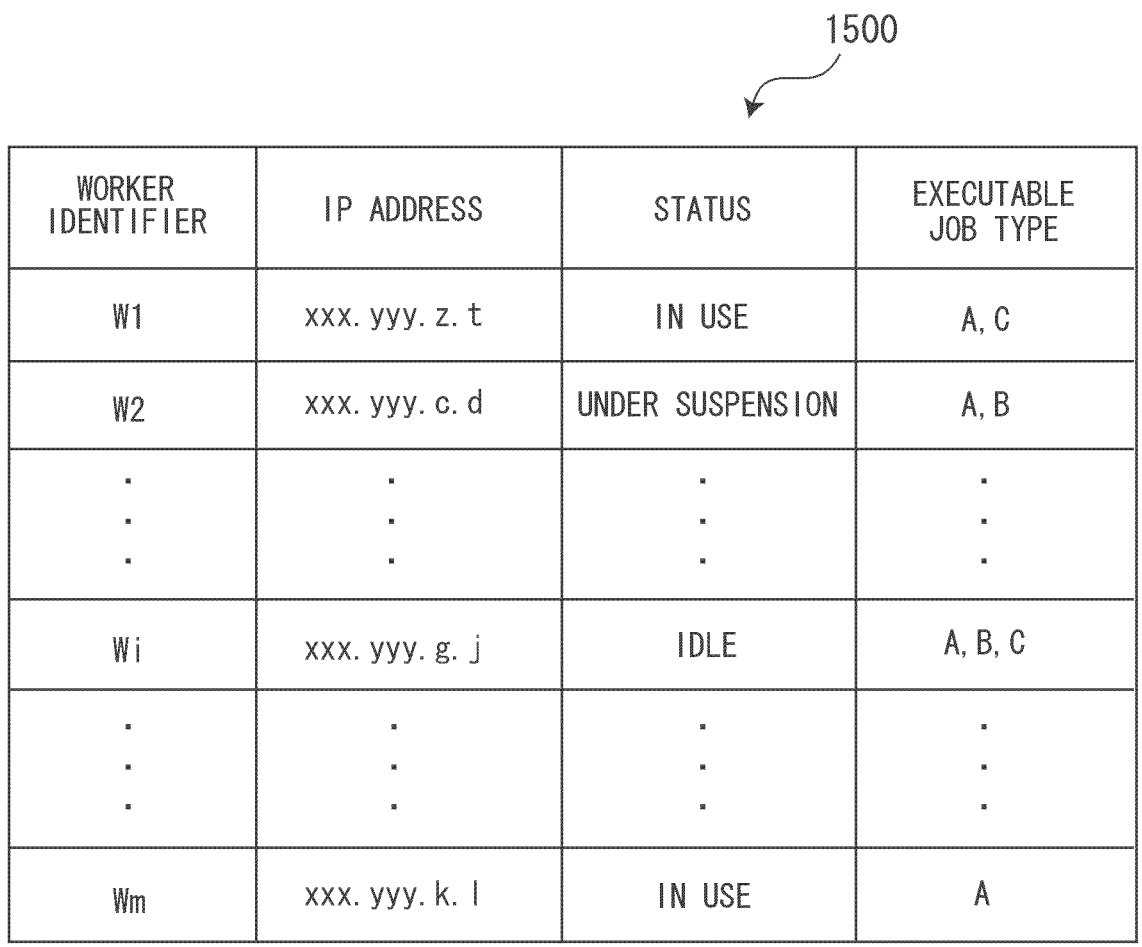
FIG. 15 is a diagram (part 2) showing a storage content of a worker managing table.

Here, the worker managing table used when the executable job type of each worker W is specified will be described. FIG. 15 is a diagram showing the storage content of the worker managing table. In FIG. 15, the IP address, the status and the executable job type are stored for every worker (W1 to Wm) in the worker managing table 1500. The executable job type is a type of jobs executable by each worker W.

Figure 16:
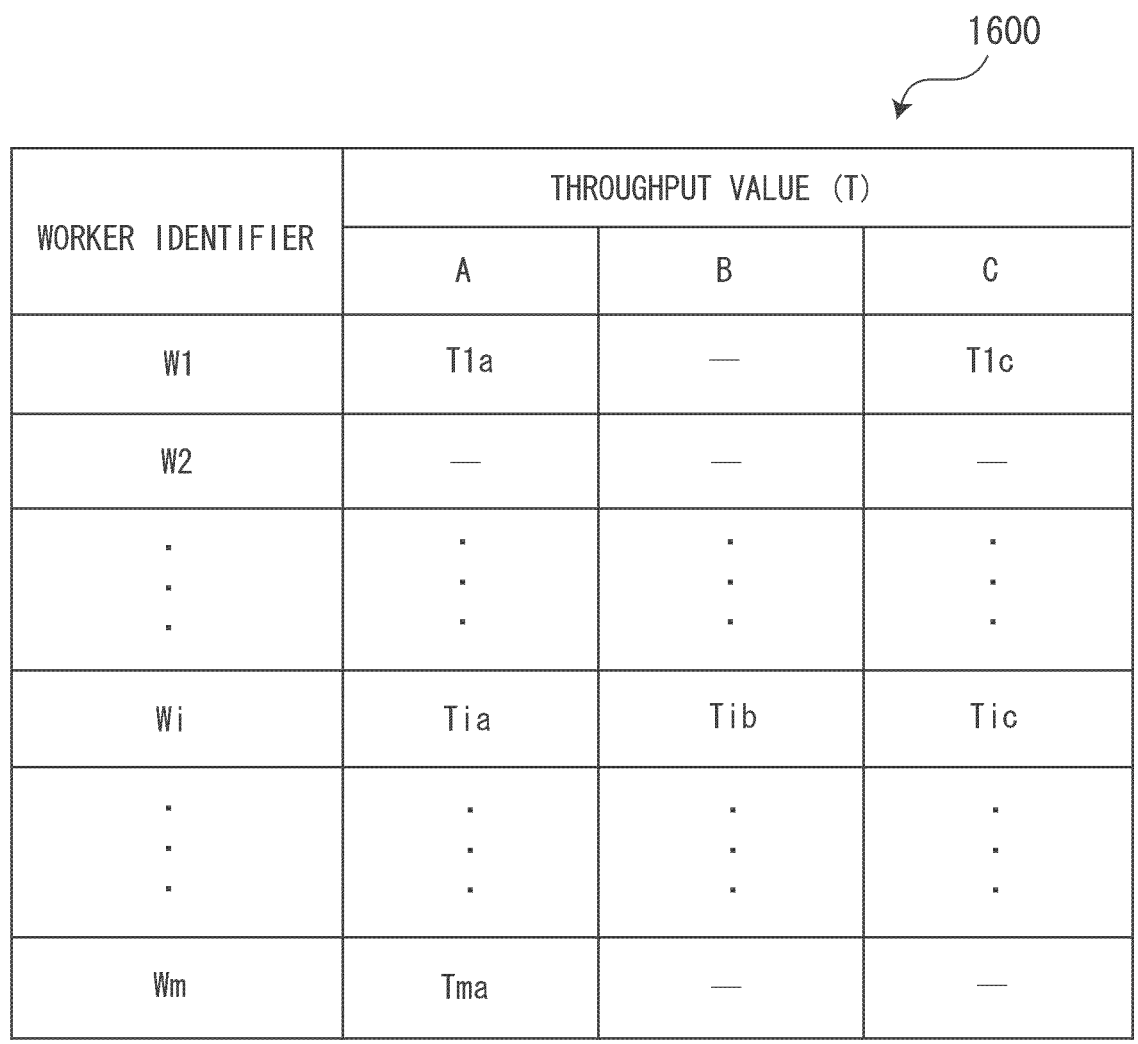
FIG. 16 is a diagram (part 2) showing a storage content of the throughput table.

Next, the throughput table used to specify the job-type-basis processing performance of each of the workers W1 to Wm will be described. FIG. 16 is a diagram showing the storage content of the throughput table. In FIG. 16, the job-type-basis throughput values of executable jobs are stored for every worker (W1 to Wm) in the throughput table 1600.

Taking a worker Wi as an example, it has a throughput value $T_{ia}$ concerning the job of the job type A, a throughput value $T_{ib}$ concerning the job of the job type B and a throughput value $T_{ic}$ concerning the job of the job type C.

Here, a specific example of the allocation destination determining processing of the determining module 601 will be described. First, the determining module 601 reads out the status and the executable job type for every worker W from the worker managing table 1500, and selects workers which can execute a job in a job queue and whose status is "idle". Then, the determining module 601 reads out the throughput value of the selected workers from the throughput table 1600, and identifies the worker W having the maximum throughput value as the allocation destination.

(Distributed Processing Flow of Distributed Processing Device)

Next, the distributed processing flow of the distributed processing device according to the second embodiment will be described. The processing other than the allocation destination determining processing of the determining module 601 (corresponding to the step S902 shown in FIG. 9) in the distributed processing flow of the distributed processing device is the same as the first embodiment and thus the description thereof is omitted. FIG. 17 is a flowchart showing another example of the allocation destination determining processing flow.

In FIG. 17, the job type of the jobs in the job queue is first obtained (step S1701). Thereafter, it is judged on the basis of the worker managing table 1500 whether there is any worker W which can execute the job type detected in step S1701 (step S1702).

Here, when there is some worker W which can execute the job type (step S1702: Yes), it is judged from the worker managing table 1500 whether there is any idle worker W out of the workers W which can execute the jobs (step S1703). Here, when there is no idle worker W (step S1703: No), the processing waits until some worker W becomes usable.

When there is some idle worker W (step S1703: Yes), the worker W having the maximum throughput value T is selected from the idle workers W on the basis of the throughput table 1600 (step S1704). The selected worker W is determined as the allocation destination (step S1705), and the processing shifts to step S903 shown in FIG. 9.

Furthermore, when there is no executable worker W in step S1702 (step S1702: No), the error processing of outputting a message indicating that it is impossible to execute the input job is executed (step S1706), and then the processing is finished.

The processing in the master M according to the second embodiment may be executed for every job queue constructed in the master M. Furthermore, the parameter table 700 (see FIG. 7) described with reference to the first embodiment may be created for every job types that can be executed by each worker W. Accordingly, the processing performance (throughput value) of each worker W can be calculated for every job type.

As described above, according to the second embodiment, the allocation destination of a job is determined in consideration of the job type which can be accepted by the worker W, whereby the job group can be allocated to the proper worker W. Accordingly, the error processing when the allocated job group cannot be executed, the processing of re-allocating the job group to another worker W, etc. can be reduced, so that the communication traffic between the master M and the worker W can be reduced.

Furthermore, by disposing the job input to the worker W in the job queue which is provided for every job type, jobs which read out the same function can be bundled, and thus the cache hit rate of the worker W can be enhanced.

According to the technique disclosed above, the jobs whose execution time per job is shorter than the communication time between the master and the worker are bundled as a job group, and subjected to distributed processing on a job-group basis by the worker group. At this time, the jobs are bundled by the job number corresponding to the communication time between the master and the worker and the processing performance of the worker, whereby the finish time can be equalized among the workers and thus the whole required time can be shortened.

The communication time between the master and the allocation destination can be calculated by using the past measurement values of the waiting time, the execution time and the elapsed time obtained by allocating the job group to the allocation destination.

The processing performance of the allocation destination can be calculated by using the past measurement values concerning the execution time obtained by allocating the job group to the allocation destination.

The allocation destination candidates can be narrowed down by excluding workers which are processing job groups allocated from the master thereto or which are functionally under suspension.

The worker which can process the job group at high speed can be identified as the allocation destination.

The job allocation destination is determined in consideration of the job types which can be accepted by the worker W, and thus the job group can be allocated to a proper worker W.

A job group obtained by making a bundle of jobs having short execution times is properly allocated, whereby the communication traffic between the master and the worker in the job processing can be reduced, and efficient distributed processing can be implemented.

The distributed processing method described with respect to the embodiments can be implemented by executing prepared programs in a computer such as a personal computer, a work station or the like. This program is recorded in a computer-readable recording medium such as a hard disk, a flexible disk, CD-ROM, MO, DVD or the like, and it is read out from the recording medium and executed by a computer. Furthermore, the program may be designed in such a format that it can be distributed to a computer through a network (transmission medium) such as the Internet or the like.

What is claimed is:

1. A non-transitory computer-readable recording medium storing a distributed processing program executed by a computer, the computer being a master computer for making a group of communicable worker computers execute distributed processing, the program causes the computer to operate as:

a determining unit for determining a worker computer as an allocation destination from the worker computer group;

a measuring unit for measuring an elapsed time from transmission of a request of a first job group to the determined allocation destination till reception of a result of the first job group and time information from the determined allocation destination, the time information indicating waiting time and execution time of the first job group;

a calculating unit for calculating a communication time based on the measured elapsed time, the waiting time, and the execution time, and for calculating a number of jobs to be allocated to the allocation destination and to be bundled on the basis of processing performance of the determined allocation destination and the communication time;

a generating unit for generating a second job group by bundling the jobs to be allocated to the allocation destination, where the number of the jobs being bundled was calculated by the calculating unit; and a transmitting unit for transmitting the generated second job group as a single processing unit to the allocation destination to process the jobs in the second job group.

2. The non-transitory computer-readable medium according to claim 1, wherein the program further causes the computer to operate as:

a receiving unit for receiving, from the allocation destination, information concerning the waiting time and the execution time of the first job group.

3. The non-transitory computer-readable medium according to claim 2, wherein the calculating unit further calculates the processing performance by using information on the execution time of the first job group.

4. The non-transitory computer-readable medium according to claim 1, wherein the determining unit determines the allocation destination from the worker computer group on the basis of a use status of each of the worker computers.

5. The non-transitory computer-readable medium according to claim 1, wherein the determining unit determines the allocation destination from the worker computer group on the basis of the processing performance of each of the worker computers.

6. The non-transitory computer-readable medium according to claim 1, wherein the determining unit determines the allocation destination from the worker computer group on the basis of a job type of a job executable by each of the worker computers.

7. A non-transitory computer-readable medium storing a distributed processing program executed by a computer, the computer being a worker computer communicable with a master computer, the program causes the computer to operate as:

an executing unit for executing processing of a job group transmitted from the master computer;

a receiving unit for receiving a processing request of the job group from the master computer;

a measuring unit for measuring an elapsed time from transmission of a request of a first job group to a determined allocation destination till reception of a result of the first job group and time information from the determined allocation destination, the time information indicating waiting time and execution time of the first job group;

a calculating unit for calculating a communication time based on the measured elapsed time, the waiting time, and the execution time; and a transmitting unit for transmitting information concerning the measured waiting time to the master computer, and which transmits a processing result of the first job group to the master computer when execution of all the jobs in the job group has been completed.

8. The non-transitory computer-readable medium according to claim 7, wherein the transmitting unit transmits information concerning the execution time measured by the measuring unit to the master computer.

9. A distributed processing device for making a communicable worker computer group execute distributed processing, the distributed processing device comprising:
   a processor that executes a process, wherein the process includes:
      determining a worker computer as an allocation destination from the worker computer group;
      measuring an elapsed time from transmission of a request of a first job group to the determined allocation destination till reception of a result of the first job group and time information from the determined allocation destination, the time information indicating waiting time and execution time of the first job group;
      calculating a communication time based on the measured elapsed time, the waiting time, and the executing time, and calculating a number of jobs to be allocated to the allocation destination and to be bundled on the basis of processing performance of the determined allocation destination and the communication time;
      generating a second job group by bundling jobs to be allocated to the allocation destination where the number of the jobs to be bundled was calculated by the calculating unit; and
      transmitting the generated second job group as a single processing unit to the allocation destination to process the jobs in the second job group.

10. A distributed processing device, comprising:
   a processor that executes a process, wherein the process includes:
      receiving a processing request of a first job group from a master computer;
      executing the processing of the first job group transmitted from a master computer;
      measuring an elapsed time from transmission of a request of the first job group to a determined allocation destination till reception of a result of the first job group and time information from the determined allocation destination, the time information indicating waiting time and execution time of the first job group;
      calculating a communication time based on the measured elapsed time, the waiting time, and the execution time of the first job group;
      transmitting information concerning the measured waiting time to the master computer; and
      transmitting a processing result of the first job group to the master computer when execution of all jobs in the first job group has been completed.

11. A distributed processing method for making a communicable worker computer group execute distributed processing, the distributed processing method comprising:
   determining a worker computer as an allocation destination from the worker computer group;
   measuring an elapsed time from transmission of a request of a first job group to the determined allocation destination till reception of a result of the first job group and time information from the determined allocation destination;
   calculating a communication time based on the measured elapsed time, the waiting time, and the execution time and of calculating a number of jobs to be allocated to the allocation destination and to be bundled on the basis of processing performance of the allocation destination and the communication time;
   generating a second job group by bundling the jobs to be allocated to the allocation destination where the number of the jobs being bundled was calculated by the calculating; and
   transmitting the generated second job group as a single processing unit to the allocation destination to process the jobs in the second job group.

12. A distributed processing method, comprising:
   executing the processing of a first job group transmitted from a master computer;
   receiving a processing request of the first job group from the master computer;
   measuring an elapsed time from transmission of a request of the first job group to a determined allocation destination till reception of a result of the first job group and time information from the determined allocation destination, the time information indicating waiting time and execution time of the first job group;
   calculating a communication time based on the measured elapsed time, the waiting time, and the execution time; and
   transmitting information concerning the waiting time measured in the measuring to the master computer, and which transmits a processing result of the first job group to the master computer when execution of all jobs in the first job group has been completed.

13. The non-transitory computer-readable medium according to claim 1, wherein the number of the jobs is calculated based on a ratio between the communication time and an estimated execution time required for the second job group being processed by the determined allocation destination.

14. The distributed processing device according to claim 9, wherein the number of the jobs is calculated based on a ratio between the communication time and an estimated execution time required for the second job group being processed by the determined allocation destination.

15. The distributed processing method according to claim 11, wherein the number of the jobs is calculated based on a ratio between the communication time and an estimated execution time required for the second job group being processed by the determined allocation destination.

* * * * *